United States Patent
Sakamoto

(10) Patent No.: US 7,590,412 B2
(45) Date of Patent: Sep. 15, 2009

(54) TERMINAL DEVICE, CENTER DEVICE AND SYSTEM FOR CONTROLLING AUDIO AND VIDEO DISTRIBUTION

(75) Inventor: Kenji Sakamoto, Chiba (JP)

(73) Assignee: Sharp Kabushiki Kaisha, Osaka (JP)

( * ) Notice: Subject to any disclaimer, the term of this patent is extended or adjusted under 35 U.S.C. 154(b) by 194 days.

(21) Appl. No.: 10/553,347

(22) PCT Filed: Apr. 15, 2004

(86) PCT No.: PCT/JP2004/005430

§ 371 (c)(1),
(2), (4) Date: Jan. 16, 2007

(87) PCT Pub. No.: WO2004/093484

PCT Pub. Date: Oct. 28, 2004

(65) Prior Publication Data

US 2007/0200727 A1 Aug. 30, 2007

(30) Foreign Application Priority Data

Apr. 17, 2003 (JP) .............................. 2003-112870
Apr. 9, 2004 (JP) .............................. 2004-116174

(51) Int. Cl.
*H04M 3/42* (2006.01)
(52) U.S. Cl. .................. 455/414.1; 455/151.2; 455/420
(58) Field of Classification Search ............. 455/414.1, 455/418, 419.42, 556.1, 557, 90.1, 151.2
See application file for complete search history.

(56) References Cited

U.S. PATENT DOCUMENTS 7,171,677 B1    1/2007  Ochiai

2002/0068558 A1 * 6/2002  Janik .......................... 455/422

FOREIGN PATENT DOCUMENTS

| JP | 4-316298 A   |   | 11/1992 |
|----|--------------|---|---------|
| JP | 06-261372    | * | 9/1994  |
| JP | 6-261372 A   |   | 9/1994  |
| JP | 7-46437 A    |   | 2/1995  |
| JP | 11-317937 A  |   | 11/1999 |
| JP | 2000-134502  | * | 5/2000  |

(Continued)

*Primary Examiner*—Blane J Jackson
(74) *Attorney, Agent, or Firm*—Birch, Stewart, Kolasch & Birch, LLP

(57) ABSTRACT

A TV main body (3) is connected, in a communication-enabled manner, with a wireless center that is connected to one or more external devices, The TV main body (3) receiving image and/or sound data from the wireless center. The TV main body (3) includes: an SS transmitting/receiving unit (61) for performing communication with the wireless center; and a TV microcomputer (64) for controlling the operation of the TV main body (3). The TV microcomputer (64) includes: an ID acquiring section (150) for acquiring, from the wireless center via the SS transmitting/receiving unit (61), identification information for identifying the external device; and a remote-controller data producing section (151) for (A) generating remote-operation data when a remote operation is performed with respect to the external device, the remote-operation data containing (a) remote operation information indicating content of the remote operation, and (b) identification information of the external device to be subjected to the remote operation, and (B) for transmitting, via the SS transmitting/receiving unit (61), the remote-operation data which has been generated.

14 Claims, 10 Drawing Sheets

FOREIGN PATENT DOCUMENTS

| | | |
|---|---|---|
| JP | 2000-134502 A | 5/2000 |
| JP | 2000-350178 A | 12/2000 |
| JP | 2001-103336 A | 4/2001 |
| JP | 2002-291073 A | 10/2002 |
| JP | 2003-46802 A | 2/2003 |

* cited by examiner

FIG. 6

| CONNECTED DEVICE | DEVICE ID | DEVICE NAME | USING TERMINAL | OPERATION ENABLED/ DISABLED | VIEWING ENABLED/ DISABLED |
|---|---|---|---|---|---|
| EXTERNAL DEVICE A | 1 | HDV-100S | TV MAIN BODY a | ENABLED | ENABLED |
| EXTERNAL DEVICE B | 2 | D-VHBS50 | TV MAIN BODY b | ENABLED | DISABLED |
| EXTERNAL DEVICE C | 3 | DR-H20000 | TV MAIN BODY c | DISABLED | ENABLED |

TERMINAL DEVICE, CENTER DEVICE AND SYSTEM FOR CONTROLLING AUDIO AND VIDEO DISTRIBUTION

TECHNICAL FIELD

The present invention relates to (i) a center device connected to at least one external device, and (ii) a terminal device or the like being connected, in a communication-enabled manner, with the center device, for receiving stream data of an image and/or a sound.

BACKGROUND ART

Recently, accompanied by development of communication networks and a rapid increase in popularity of the internet, an increasing number of offices and households are building LANs (Local Area Networks). Further, there is a remarkable increase in need for so-called wireless LANs. This is because (I) digital wireless communication technology has advanced, and (II) the wireless LAN allows a user to wirelessly establish a LAN, so that the user is freed from burdens due to wiring. Further, since the wireless LAN allows a mobile terminal, such as a laptop computer, to be used in a mobile environment, a significant increase in a popularity of the wireless LAN is expected in the future.

As a representative technology for such a wireless LAN, there is IEEE802.11, which is already standardized by IEEE (Institute of Electrical and Electronics Engineers). IEEE802.11 prescribes from a physical layer to a MAC (Media Access Control) Layer in an OSI (Open Systems Interconnection) model, the MAC layer being a lower layer of a data link. Further, IEEE 802.11 can be replaced by Ethernet® which is a wired LAN transmission channel. Further, since IEEE 802.11 is a wireless technology, it can provide a roaming function as an additional function.

Today, new terrestrial digital broadcasting is in the process of replacing terrestrial analog broadcasting, which is currently viewed/listened to throughout Japan. This terrestrial digital broadcasting, which was launched in 2003 in three major metropolitan areas of Japan (i.e., Kanto, Kinki, and Tokai areas), is due to spread through the rest of Japan by 2006. Along with this, the current terrestrial analog broadcasting will fall into disuse by 2011.

ISDB (Integrated Services Digital Broadcasting) is a format for integrated digital broadcasting of the next generation. This format allows various kinds of information, such as images, sound, and data, to be handled in the form of digital data. As specific examples of services adopting ISDB, digital television broadcasting, digital voice broadcasting, facsimile broadcasting, multimedia broadcasting, or the like are under development. Under ISDB, it is planned that a satellite broadcast wave, a terrestrial broadcast wave, or a wired transmission channel (e.g., coaxial cable, or optical fiber) will be used as a transmission channel (extracted and translated from Nikkei BP digital unabridged dictionary; published by Nikkei Business Publication inc.).

ISDB-T(Terrestrial), which is an ISDB technical standard for terrestrial digital broadcasting, adopts a modulation method called OFDM (Orthogonal Frequency Division Multiplexing) in which many carriers are used. With the use of this method, it becomes possible to restrain ghosting, which occurs due to multiple-paths caused by, for example, a reflection of a signal from a building. Further, remarkably many signal formats are allowed under ISDB-T. This is because ISDB-T prescribes a plurality of: (I) transmission modes, each of which prescribes an interval of the carriers; (II) modulation methods, each of which is defined on a carrier-by-carrier basis; and (III) guard intervals in a direction of the time axis, each of which is provided for every effective symbol length. Amongst the allowable formats, an optimum format is selected in accordance with a service type, such as a service in which a fixed-reception is carried out, or a service in which a mobile-reception is carried out.

Further, under the ISDB-T, a single transmission channel (communication channel)(Band of approximately 5.6 MHz) is divided into 13 segments (1 segment=approx. 430 kHz). Each of the segments serves as a unit at which a modulation method is varied. This allows a broadcasting station to desirably determine a signal configuration in one channel; e.g., a signal configuration including voice broadcasting, high-vision broadcasting, standard fixed broadcasting, and mobile broadcasting.

ISDB-T adopts an interleave in a direction of the time axis, and an electric wave used is suitable for data-transmission with respect to a mobile device. On this account, it is one of the distinct characteristics of ISDB-T that stable reception is possible even with a mobile receiver such as an in-vehicle television, or a portable terminal such as a PDA (Personal Digital Assistant) or mobile phone. A service assuming such a mobile reception will cause a great deal of expectations in the future.

Incidentally, in such a wireless communication system, there has been a wireless AV system including: (I) one center device provided with various tuners and/or external input terminals or the like; and (II) a plurality of terminal devices, for (i) wirelessly receiving content data from the center device, and (ii) carrying out a display output and/or an audio output. In this case, a user can control the center device via wireless communication, by entering an instruction or the like for remotely operating the terminal device.

More specifically, in such a wireless AV system, when the user uses a remote operation device (hereinafter referred to as remote controller) for outputting, to the terminal device, a remote-controller signal from the remote controller, the terminal device encodes the remote-controller signal thus received, and then transmits the encoded-data to the center device. The center device decodes the encoded-data thus received, so as to obtain the remote-controller signal. Then, based on the remote-controller signal thus obtained, a predetermined control is carried out.

Here, if the remote-controller signal which is obtained by the center device contains, as it is, the remote-controller signal received by the terminal device, an LED (Light Emitting Diode) device or the like is used for, for example, transmitting the remote-controller signal in the form of an infrared signal. This infrared signal is received by an infrared receiving section of an external device existing in a vicinity of the center device, so that the remote operation carried out by the user with respect to the terminal device is carried out with respect to the external device. In the present specification, such a remote operation is hereinafter referred to as "remote-control-through".

Patent document 1 discloses an audiovisual distribution system having the remote-control-through function. This audiovisual distribution device includes: (I) an audiovisual transmitting device for wirelessly transmitting audiovisual content; (II) an audiovisual receiving device for (i) receiving the audiovisual content thus transmitted, and (ii) causing an image-receiving device, such as a connected television or the like, to display the audiovisual content.

Firstly, the user uses an AV-device-selecting button, so as to select a desired AV device through the audiovisual receiving device. Then, by using the remote controller, the user enters a reproduction instruction or the like. Next, the audiovisual transmitting device analyzes AV-device-selection information in a telegraphic message wirelessly transmitted from the audiovisual receiving device, so as to select the AV device. Next, the audiovisual transmitting device causes its infrared emitting section to emit light, based on infrared data having been wirelessly received from the audiovisual receiving device, so as to transmit the infrared data to the AV device. Then, the audiovisual receiving device receives the audiovisual content transmitted from the selected AV device, and then displays the audiovisual content on the image-receiving device such as a television.

In this way, it is possible to (I) select the desired AV device from the plurality of the AV devices, and (II) reproduce, on a TV which is not directly connected to the AV device (e.g., a TV in a remote area such as an adjacent room), the audiovisual content transmitted from the selected AV device.

Further, Patent document 2 discloses a system in which a user-terminal having a remote-controller function is connected with a server device, in a communication-enabled manner, via a network, the system including means for transmitting, upon a request from the user, specified remote-controller information to the user-terminal.

Here, Patent document 1 is Japanese Unexamined Patent Publication No. 134502/2000 (Tokukai 2000-134502; published on May 12, 2000).

Here, Patent document 2 is Japanese Unexamined Patent Publication No. 291073/2002 (Tokukai 2002-291073; published on Oct. 4, 2002).

In the foregoing wireless AV system, the following case is possible. Namely, a plurality of users may remotely operate a plurality of terminal devices. Further, a plurality of external devices may be connected to the center device. In these cases, the center device may not be able to identify which external device the instruction of the remote operation entered by the user is directed to. This problem occurs likewise in the above-mentioned remote-control-through.

In view of the foregoing problem, in Patent document 1, the user uses the AV-device-selecting button for selecting the desirable AV device using the audiovisual receiving device (terminal device). Then, the audiovisual receiving device transmits, to the audiovisual transmitting device (center device), the AV-device-selection information along with the infrared data, so that the audiovisual transmitting device can analyze the AV-device-selection information and select an operation-targeted AV device.

However, there are various kinds of the external devices that can be connected to the center device. For example, the external device can be: (I) an apparatus for recording and reproducing an image and a sound, such as a VTR (Video Tape Recorder), a DVD (Digital Versatile Disk) recorder, and a HDD (Hard Disk Drive) recorder; (II) an apparatus for receiving various broadcast signals such as an STB (Set Top Box) and a tuner; and (III) an apparatus for creating image and sound signals, such as a video camera. Accordingly, it is necessary to increase the number of buttons, corresponding to the variety of the external devices.

Further, if (i) AV-device-selecting buttons of the terminal device are assigned on a basis of a connection configuration of the AV devices with respect to the center device, and (ii) the configuration of the connections between the center device and the AV devices changes, it is not possible to know which one of the AV-device-selecting buttons allows the remote operation of which one of the AV devices.

The present invention is made in view of the foregoing problem, and it is an object of the present invention to provide a terminal device, a center device, a communication system or the like, each of which allows remote operation of a desired external device, through a plurality of terminal devices, even if various external devices are connected to the center device Further, it is also an object of the present invention to provide a wireless AV system including a plurality of AV devices, the system such that data, for use in identifying an external device that is the target of an operation, can be transmitted/received along with remote-control data, when the remote-controller data is wirelessly transmitted/received between devices, upon operation of a remote-controller.

DISCLOSURE OF INVENTION

In order to achieve the foregoing object, a terminal device of the present invention is a terminal device connected, in a communication-enabled manner, with a center device, so that an image and/or a sound data is received from the center device, the center device being connected with at least one external device, the terminal device including: communication means for communicating with the center device; and control means for controlling an operation of the terminal device, the control means including: identification information acquiring means for acquiring, from the center device via the communication means, identification information for identifying the external device; remote-operation data producing means for generating remote-operation data when a remote operation is performed with respect to the external device, the remote-operation data containing (a) remote operation information indicating content of the remote operation, and (b) identification information of the external device to be subjected to the remote operation; and remote-operation data transmitting means for transmitting, to the center device via the communication means, the remote-operation data having been generated by the remote-operation data producing means.

With this configuration, the identification information acquiring means acquires, from the center device, the identification information for identifying the external device. When the external device is remotely operated, the remote-operation data transmitting means transmits, to the center device, the remote-operation data including (I) the identification information of the operation-target external device and (II) remote-operation information. This allows the center device to specify the operation-target external device, with reference to the identification information in the remote-operation data received from the terminal device.

Further, by receiving, from the center device, the identification information for identifying the external device connected to the center device, the terminal device is able to use the identification information for selecting the operation-target external device. Accordingly, it is not necessary to select the operation-target external device from various kinds of external devices that can possibly be connected to the center device.

Further, even if the connection configuration of the external device with respect to the center device is changed, the terminal device can suitably select the operation-target external device by obtaining, from the center device, the identification information which is based on the connection configuration which has been changed.

The terminal device of the present invention may further include remote-controller signal receiving means for receiving a remote-controller signal from a remote-controlling device for use in remotely operating the terminal device, wherein the remote-operation data producing means of the control means generates the remote-operation data, based on the remote-controller signal received by the remote-controller signal receiving means.

In the foregoing configuration, the remote-operation data producing means is able to generate the remote-operation data based on the remote-controller signal from the remote controlling device, and transmit the remote-operation data to the center device. Accordingly, the user does not have to directly operate the terminal device, and yet the user is able to perform, by operating the remote controlling device, a desired remote operation with respect to a desired external device which is connected to the center device.

Note that it is preferable if the remote-operation data producing means generates remote-controller information, based on the remote-controller signal, and adds the identification information to the remote-controller information, so as to generate the remote-operation data.

In order to achieve the foregoing object, a center device of the present invention is a center device, to which at least one external device is connected, for transmitting image and/or sound data to a terminal device, the center device including: communication means for communicating with the terminal device; storage means for storing therein identification information for identifying the external device; and control means for controlling an operation of the center device, the control means including: identification information transmitting means for transmitting, to the terminal device via the communication means, the identification information stored in the storage means; remote-operation data acquiring means for acquiring, from the terminal device via the communication means, remote-operation data for remotely operating the external device, the remote-operation data containing (a) remote-controller information indicating content of the remote operation, and (b) identification information of the external device to be subjected to the remote operation; and remote control means for remotely operating, in accordance with the remote-controller information in the remote-operation data, the external device corresponding to the identification information in the remote-operation data acquired by the remote-operation data acquiring means.

In the configuration, the identification information transmitting means transmits, to the terminal device, the identification information for identifying the external device. Further, the remote-operation data acquiring means acquires, from the terminal device, the remote-operation data including (I) the identification information of the operation-target external device and (II) the remote-operation information. This allows (I) the center device to specify the operation-target external device, with reference to the identification information in the remote-operation data received from the terminal device, and (II) the remote control means to remotely operate the appropriate external device.

Further, the center device transmits, to the terminal device, the identification information for identifying the external device connected to the center device, so as to enable the terminal device to use the identification information for selecting the operation-target external device. Accordingly, it is not necessary for the terminal device to select the operation-target external device from various kinds of external devices that can possibly be connected to the center device.

Further, even if the connection configuration of the external device with respect to the center device is changed, the center device can transmit the identification information which is based on the connection configuration which has been changed, so as to enable the terminal device to suitably select the operation-target external device.

The center device of the present invention is so adapted that the storage means further stores therein device-use-information indicating a use-status of the external device; and the remote control means judges, based on the device-use-information, whether or not the remote operation is performed.

Incidentally, in the foregoing Patent document 1, it is not assumed that infrared data is transmitted from a plurality of audiovisual receiving devices to an audiovisual transmitting device. Accordingly, if the plurality of the audiovisual receiving devices remotely operate a single AV device, for example, reproduction of audiovisual content may be disrupted, or a piece of audiovisual content is switched to another piece of audiovisual content.

On the other hand, in the center device of the present invention, the remote control means judges whether or not to perform a remote operation based on device-use information. As such, the foregoing problem is avoided even if a plurality of terminal devices remotely operate a single external device.

Note that, in many cases, the external device has an infrared remote-controlling function. Accordingly, it is preferable that the center device further include infrared transmitting means for transmitting a signal, in a form of infrared light, to the external device, the signal being used for the remote control means to remotely operate the external device. In this way, the center device does not have to include a configuration for remotely operating the external device, for each of the external devices.

Further, the same effect can be obtained from a communication system in which the foregoing terminal device is connected, in a communication-enabled manner, with the foregoing center device. In such a case, the terminal device and the center device may wirelessly communicate with each other.

In order to achieve the foregoing object, a method of the present invention for controlling a terminal device is a method for controlling a terminal device which is connected, in a communication-enabled manner, with a center device so that an image and/or a sound data is received from the center device the center device to which at least one external device is connected, wherein: the terminal device includes communication means for communicating with the center device; and the method includes the steps of: acquiring, from the center device via the communication means, identification information for identifying the external device; generating remote-operation data when a remote operation is performed with respect to the external device, the remote-operation data containing (a) remote operation information indicating content of the remote operation, and (b) identification information of the external device to be subjected to the remote operation; and transmitting the remote-operation data, which has been generated, to the center device via the communication means.

In the method, in the step of acquiring the identification information, the identification information for identifying the external device is acquired from the center device. Further, when the external device is remotely operated, the remote-operation data is transmitted to the center device in the step of transmitting the remote-operation data, the remote-operation data including (I) the identification information of the operation-target external device and (II) the remote-operation information. This allows the center device to specify the operation-target external device, with reference to the identification information in the remote-operation data received from the terminal device.

Further, by receiving, from the center device, the identification information for identifying the external device connected to the center device, the terminal device is able to use the identification information for selecting the operation-target external device. Accordingly, it is not necessary to select the operation-target external device from various kinds of external devices that can possibly be connected to the center device.

Further, even if the connection configuration of the external device with respect to the center device is changed, the terminal device can suitably select the operation-target external device by obtaining, from the center device, the identification information which is based on the connection configuration which has been changed.

In order to achieve the foregoing object, a method of the present invention for controlling a center device is a method for controlling a center device to which at least one external device is connected, the center device being for transmitting image and/or sound data to a terminal device, wherein: the center device includes (a) communication means for communicating with the terminal device, and (b) storage means for storing therein identification information for identifying the external device; and the method includes the steps of: transmitting, to the terminal device via the communication means, the identification information stored in the storage means; acquiring, from the terminal device via the communication means, remote-operation data for remotely operating the external device, the remote-operation data containing (a) remote-controller information indicating content of the remote operation, and (b) identification information of the external device to be subjected to the remote operation; and remotely operating, in accordance with the remote-controller information in the remote-operation data, the external device corresponding to the identification information in the remote-operation data that has been acquired.

In the method, in the step of transmitting the identification information, the identification information for identifying the external device is transmitted to the terminal device. Further, the remote-operation data is acquired from the terminal device in the step of acquiring the remote-operation data, the remote-operation data including (I) the identification information of the operation-target external device and (II) the remote-operation information. With this method the center device can specify the operation-target external device, with reference to the identification information in the remote-operation data received from the terminal device, so as to remotely operate the appropriate external device.

Further, the center device transmits, to the terminal device, the identification information for identifying the external device connected to the center device, so as to enable the terminal device to use the identification information for selecting the operation-targeted external device. Accordingly, it is not necessary for the terminal device to select the operation-target external device from various kinds of external devices that can possibly be connected to the center device.

Further, even if the connection configuration of the external device with respect to the center device is changed, the center device can transmit the identification information which is based on the connection configuration which has been changed, so as to enable the terminal device to suitably select the operation-target external device.

Note that the control means in the foregoing terminal device can be realized by a computer running a terminal device controlling program. Note that the control means in the foregoing center device can be realized by a computer running a center device controlling program. Moreover, by storing, in a computer-readable recording medium, the terminal device controlling program and/or the center device controlling program, it is possible to execute in an arbitrary computer, the terminal device controlling program and/or the center device controlling program.

As described, in a communication system of the present invention, the identification information for identifying the external device is transmitted from the center device to the terminal device. Further, from the terminal device, the remote-operation data including (I) the identification information of the operation-target external device and (II) the remote-operation information is transmitted to the center device. Accordingly, the center device is able to specify the operation-target external device, with reference to the identification information in the remote-operation data received from the terminal device. This allows the center device to remotely operate the appropriate external device.

Additional objects, features, and advantages of the present invention will be made clear by the description below. Further, the beneficial effect of the present invention will be evident from the following explanation in reference to the drawings.

BRIEF DESCRIPTION OF DRAWINGS

FIG. 6 is a diagram illustrating an exemplary configuration of a connected-device information table stored in an EEPROM of the wireless center illustrated in FIG. 4.

BEST MODE FOR CARRYING OUT THE INVENTION

Embodiment 1

The following describes, in detail, a preferred embodiment of the present invention, with reference to attached figures.

Figure 1:
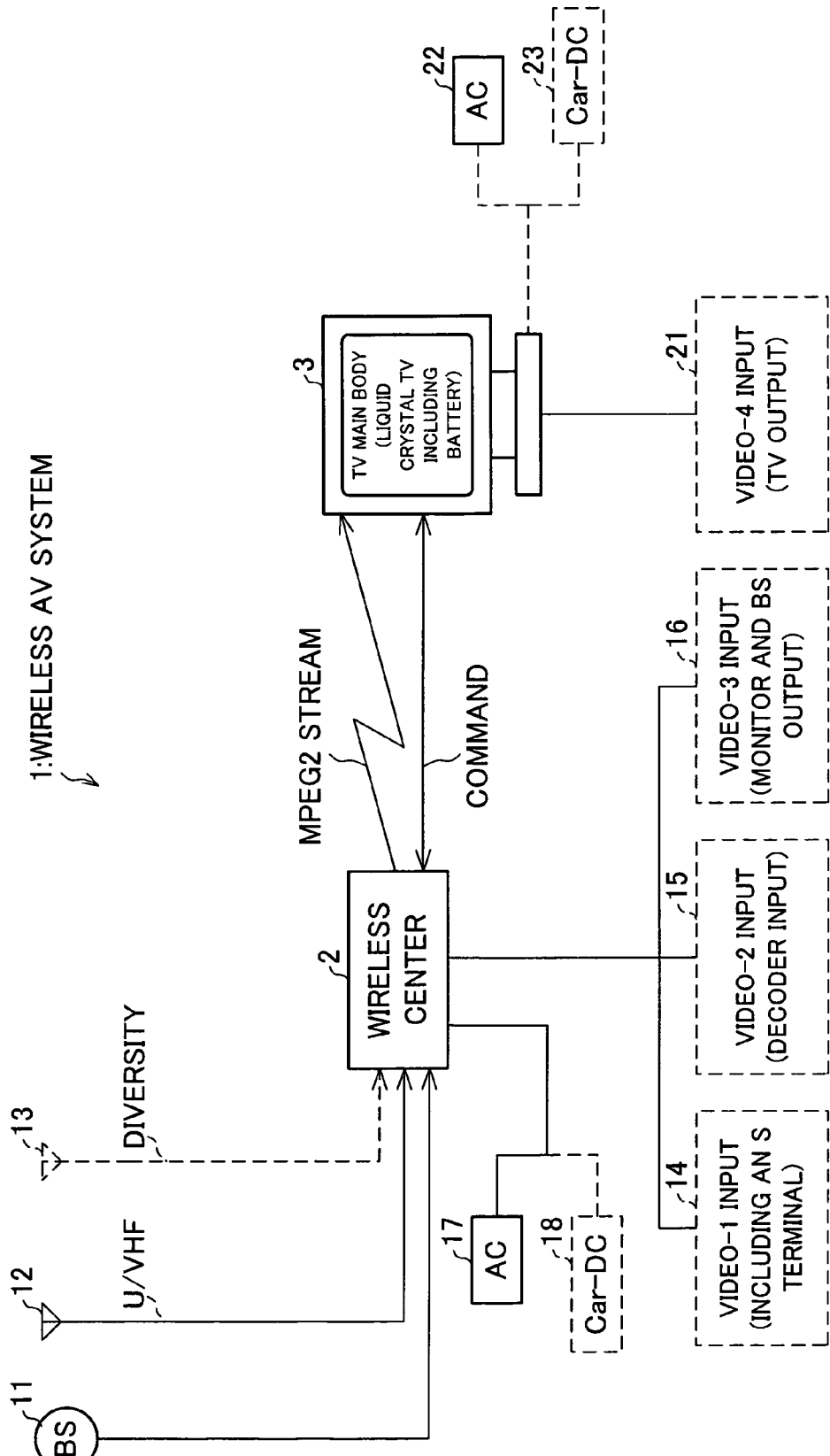
FIG. 1 shows an embodiment of the present invention, and is a block diagram illustrating a configuration of a wireless AV system.

FIG. 1 shows an embodiment of the present invention, and is a block diagram illustrating a configuration of a wireless AV system 1. In the wireless AV system 1 of the present embodiment, the present invention is applied to a wireless TV receiving device whose display is detachable. Further, FIG. 11 is an explanatory diagram illustrating a schematic wireless AV system illustrated in FIG. 1.

Figure 11:
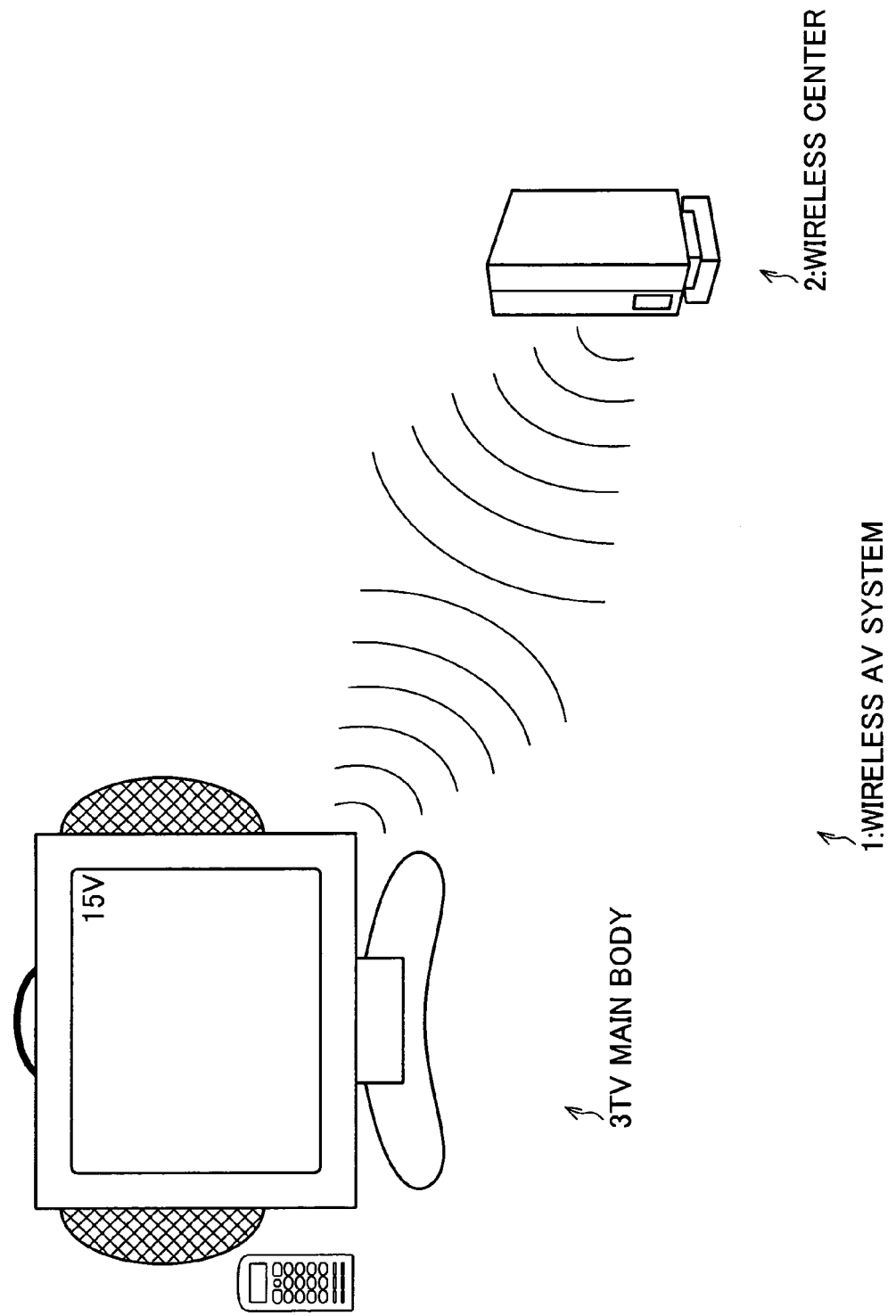
FIG. 11 is an explanatory diagram illustrating an overview of the wireless AV system illustrated in FIG. 1.

As shown in FIG. 1 and FIG. 11, the wireless AV system 1 (communication system) includes: a wireless center unit (hereinafter, wireless center) 2 serving as a base device; and a television (TV) main body unit (hereinafter, TV main body) 3 serving as a portable terminal (wireless terminal). The wireless center 2 (wireless communication device, center device) and the TV main body 3 (wireless communication device, display device, terminal device) are paired so as to form a wireless transmission network.

As FIG. 11 shows, the TV main body 3 operates by wireless and includes a battery. The TV main body 3 also includes a remote controller so as to remotely operate a device such as a videocassette recorder. The wireless center 2 is connected to antennas for broadcasting satellite and/or U/VHF broadcasting etc., and to AV equipments such as a DVD player and/or a videocassette recorder. This arrangement allows image and/or audio data to be supplied wirelessly from the wireless center 2 to the TV, main body 3. This arrangement also allows commands to be two-way transmitted in a wireless manner between the wireless center 2 and the TV main body 3.

As illustrated in FIG. 1, the wireless center 2 includes antenna terminals; i.e., a BS terminal 11, a U/VHF antenna terminal 12, a diversity terminal 13. Further, the wireless center 2 includes: an video-1 input terminal (including an S terminal) 14 for connecting devices such as a digital VTR, DVD player or the like; an video-2 input terminal (decoder input) 15; an video-3 input terminal (for both monitor and BS output) 16; and a power supply terminal through which power is supplied from an AC power source 17 or a Car-DC power source 18.

The TV main body 3 includes: an video-4 input terminal (-also used for TV output) 21 for connecting devices such as a digital VTR, DVD (Digital Versatile Disc) player; and a power-supply input terminal through which power is supplied from an AC power source 22 or a Car-DC power source 23.

The TV main body 3 is a thin display device which is detachable from the wireless center 2, and which is mobile or portable with a built-in battery. The TV main body 3 is such a broad concept that include various display devices such as, a liquid crystal television (hereinafter, a liquid crystal TV), inorganic EL display/organic EL display, and a plasma display. The TV main body 3 is not limited to a specific one by the mechanism. In the present specification, the TV main body 3 mainly has functions such as a display output function capability and audio output function, while the wireless center 2 has a control function for mainly controlling a tuner section and the TV main body 3. In the present embodiment, a thin liquid crystal television display is taken as an example of the TV main body 3.

Between the wireless center 2 and the TV main body 3, data (image and/or audio data) is exchanged based on SS (Spread Spectrum) wireless system in conformity to the IEEE 802.11b standard. Since 5 GHz band has recently been opened to the public, the 5 GHz band may be used in place of 2.4 GHz band. An image-compressing format of MPEG (Moving Picture Expert Group) 2 is used for transmitting moving picture data, a DVD-video, or a digital broadcasting, from the wireless center 2 to the TV main body 3, via a communication line with a transmission speed of over 10 Mbps. An SS wireless method is used for transmitting commands (control commands including transmission channel changing information) between the wireless center 2 and the TV main body 3.

In a case of applying an actual application while including a stream (bit strings) obtained by encoding an MPEG video and MPEG audio, and/or other encoded streams, it is necessary to: (I) multiplex and combine the plurality of the encoded streams along with a sync signal, so as to form a single stream ; and (II) convert the stream into a data format in conformity to a unique physical format and/or protocol of a storage medium or a network.

Under MPEG2 system, there is (I) a program stream (MPEG2-PS) which configures a single program, as is the case of MPEG1; and (II) a transport stream (MPEG2-TS) capable of configuring a plurality of programs.

Although an MPEG stream may often be one-bit flag, the MPEG stream is basically a byte stream obtained by bringing bytes into line for every unit of a header or the like. A data configuration common to all MPEG system is as follows. Namely, information indicating a length is provided ahead of a non-fixed-length data portion. If the data portion is not necessary, the data portion is skipped, and a header of the following data set is confirmed. This allows a highly reliable separation process.

In a device for receiving the image signal and the audio signal which are compressed in compliance with an MPEG2 encoding method, it is necessary to conform sampling frequencies of the image data and the audio data on the encoding side to those or STC (System Time Clock) on the decoding side, so as to prevent overflow or underflow of the image data and the audio data on the decoding side.

On this account, a decoding device uses PCR (Program Clock Reference) or SCR (System Clock Reference) being prescribed based on an MPEG2 system standard (ISO/IEC standard 13818-1), so as to coincide the sampling frequencies of the image data and the audio data on the encoding side with those on the decoding side.

Figure 2:
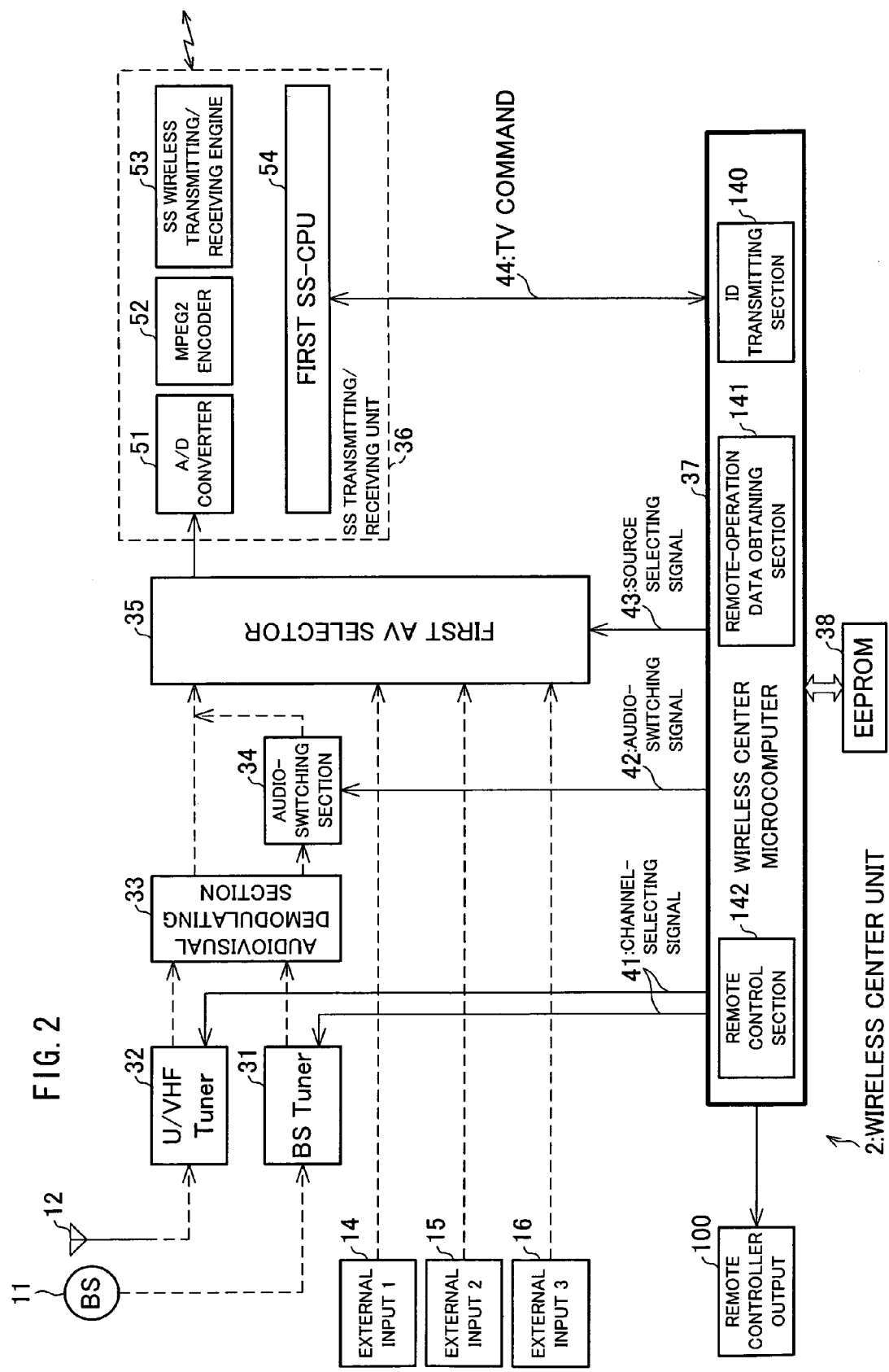
FIG. 2 is a block diagram illustrating a configuration of a wireless center in the wireless AV system illustrated in FIG. 1.

FIG. 2 is a block diagram illustrating a configuration of the wireless center 2 in the wireless AV system 1.

As illustrated in FIG. 2, the wireless center 2 includes: (I) a BS tuner 31, connected to the BS terminal 11, for receiving and selecting a BS broadcasting in response to a channel-selecting signal 41; (II) a U/VHF tuner 32, connected to the U/VHF antenna terminal 12, for receiving and selecting a U/VHF broadcasting in response to the channel-selecting signal 41; (III) an image and audio demodulating section 33 for demodulating image data and audio data (AV) signal which have been received and selected by the BS tuner 31 or the U/VHF tuner 32; (IV) an audio-switching section 34 for performing, in response to an audio-switching signal 42, a switching over between (a) a sound received and (b) information related to programs such as EPG (Electrical Program Guide); (V) a first selector 35 for performing, in response to a source selecting signal 43, a selection of either one from (a) image and audio information which has been received, (b) information related to a program, and (c) external input information from the video-1 input terminal (external input-1) 14, the video-2 input terminal (decoder input) (external input-2) 15, or the video-3 input terminal (for both monitor and BS output) (external input-3) 16; (VI) an SS transmitting/receiving unit 36 (communication means) for (a) transmitting/receiving a TV command signal 44, (b) converting, into an image compression format of MPEG2, the data selected by the first selector 35, and (c) transmitting the converted data to the TV main body 3 in compliance with the SS wireless method; (VII) a wireless center micro computer (Hereinafter, micro computer) (control means) 37 for (a) transmitting the channel-selecting signal 41, the audio-switching signal 42, the source selecting signal 43, or the like, and (b) transmitting/receiving the TV command signal 44, so as to control the overall device; (VIII) an EEPROM (electrically erasable programmable ROM) 38 (storage means) for storing therein various kinds of data such as (a) a control program for the wireless center micro computer 37, (b) communication control data, and (c) a transmission channel changing program, the EEPROM serving as a nonvolatile memory; and (IX) an: IrDA terminal (remote controller output) 100 for performing wireless communication, under IrDA standard, with respect to an external device.

The wireless center 2 may include a plurality of broadcast receiving tuners. In this case, the wireless center 2 includes 2 broadcast receiving tuners; i.e., the BS tuner 31 and the U/VHF tuner. Further, at least one of the tuners may be capable of receiving a terrestrial digital broadcasting.

The SS transmitting/receiving unit 36 includes: (I) an A/D converter 51 for converting, into a digital signal, the data selected by the first selector 35; (II) an MPEG2 encoder 52 for converting the data into the MPEG2 image compression format; (III) an SS wireless transmitting/receiving engine 53 including (a) an SS wireless device for transmitting the transmission data in compliance with the SS wireless method and (b) a wireless control section; and (IV) a first SS-CPU 54 for controlling each section of the SS transmitting/receiving unit 36, and detecting an electric wave condition.

The SS wireless receiving engine 53 has: (I) a transmitting function for transmitting an MPEG2 stream, a command, or the like to an SS transmitting/receiving unit 61 (described later with reference to FIG. 3) of the TV main body 3; and (II) a receiving function for receiving a command or the like from the SS transmitting/receiving unit 61.

The specifications of the wireless center 2 and the TV main body 3 can be changed by writing a different program into the EEPROM 38. That is to say, to avoid the time loss during the changing of the content of mask ROM for each debugging in a system development, a nonvolatile memory, e.g. EPROM and EEPROM, has recently been adopted as a program ROM. This allows a considerable reduction in the time required for program development and remediation. It is also possible to easily upgrade and change the functions by replacing a program in the EEPROM-with a downloaded program.

The IrDA terminal 100 is for performing a remote-control-through so that a remote-controller signal is transmitted, via the TV main body 3 (described later), to an external device connected with the wireless center 2. Such an IrDA terminal 100 is provided outside the wireless center 2, and is connected to an IrDA light emitting device including an LED light emitting device or the like.

Figure 3:
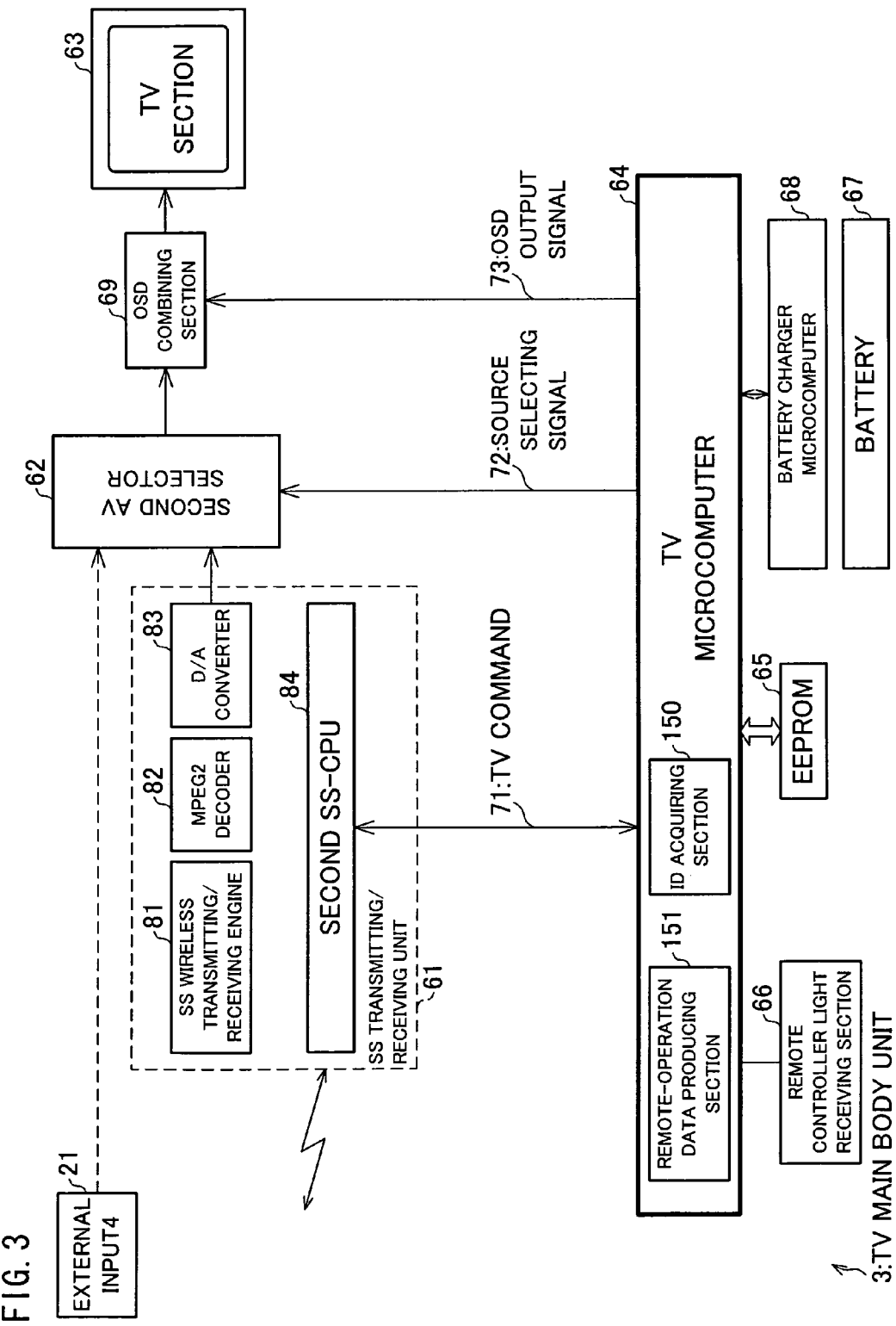
FIG. 3 is a block diagram illustrating a configuration of a TV main body in the wireless AV system illustrated in FIG. 1.

FIG. 3 is a block diagram illustrating a configuration of the TV main body 3 in the wireless AV system 1.

As illustrated in FIG. 3, the TV main body 3 includes: (I) an SS transmitting/receiving unit 61 (communication means) for (a) transmitting/receiving a TV command signal 71, (b) receiving an MPEG2 stream or a command transmission data transmitted from the SS transmitting/receiving unit 36 in the wireless center 2, and (c) decoding the MPEG 2 stream thus received so that original data is restored from the MPEG2 stream; (II) a second selector 62 for performing, based on a source-selecting signal 72, a selection of either one from (a) the data restored by the SS transmitter/receiver unit 61 and (b) an AV signal externally inputted via the video-4 input terminal (used also for TV output) (external input-4) 21; (III) a TV section 63 (a part of reporting means) including an LCD (liquid crystal display), a speaker, and the like, which output an image signal and a sound signal; (IV) an OSD combining section 69 for performing, in response to an OSD output signal 73, a superposition of an OSD (On-Screen-Display) and an original image of a TV broadcasting or the like; (V) a TV microcomputer 64 (a part of reporting means, control means) for (a) transmitting/receiving the TV command signal 71, and (b) transmitting the source selecting signal 72, the OSD output signal 73, and the like, so as to control the overall device; (VI) an EEPROM (electrically erasable programmable ROM) 65 for storing therein various kinds of data such as (a) a control program for the TV microcomputer 64, (b) the communication control data, and (c) the transmission channel changing program, the EEPROM 65 serving as a nonvolatile memory; (VII) a remote controller light receiving section 66 (remote-controller signal receiving means) for receiving a control command from a remote controlling device (not shown); (VIII) a battery 67; and (IX) a battery charger micro computer 68 for controlling electric charging/discharging with respect to the battery 67.

The SS transmitting/receiving unit 61 includes: (I) an SS wireless transmitting/receiving engine 81 including (a) an SS wireless device for receiving the transmission data which has been transmitted in compliance with the SS wireless method and (b) a wireless control section; (II) an MPEG2 decoder 82 for decoding the MPEG2 stream received; (III) the D/A converter 83 for converting the data decoded into an analog signal; (V) a second SS-CPU 84 (communication condition detecting means) for controlling each section of the SS transmitting/receiving unit 61, and for detecting an electric wave condition.

The SS wireless transmitting/receiving engine 81 includes: (a) a receiving function for receiving an MPEG2 stream, a command, or the like from the SS transmitting/receiving unit 36 of the wireless center 2; and (b) a transmitting function for transmitting a command or the like from the SS transmitting/receiving unit 61.

The second SS-CPU 84 particularly serves as electric-wave-condition detecting means for detecting a communication condition (strength of electric wave, or disturbance of communicating path) between the wireless center 2 and the TV main body 3 in accordance with (a) an electric field strength of received electric wave, (b) an error rate, and(c) a re-transmission request based on the error rate. Information indicating the electric-wave-condition thus detected is transmitted, as the TV command signal 71, to the TV microcomputer 64. Note that the information may be transmitted, as a command, to the SS transmitting/receiving unit 36 of the wireless center 2. In the present embodiment, the second SS-CPU 84 of the TV main body 3 has the electric wave condition detecting function. However, it is possible that the first SS-CPU 54 of the wireless center 2 has the similar function, so as to transmit, as a command, the information indicating the detected electric wave condition from the wireless center 2 to the TV main body 3. Alternatively, it is possible that both the first SS-CPU 54 and the second SS-CPU 84 may have the electric wave condition detecting function. Further, the electric wave condition detecting function may be realized by using the TV microcomputer 64 or the wireless center microcomputer 37.

The TV microcomputer 64 controls the overall device, and it also serves as informing means for informing of, in accordance with the communication condition detected, a message indicating (I) that image and audio data is disrupted, (II) that the transmission channel is being changed, (III) the transmission channel is being connected, and/or providing information about reception sensitivity including information that the TV main body 3 is out of the communication range.

The TV microcomputer 64 counts a time period during which the a communication is disrupted, and carries out a transmission channel changing control in which the transmission channel in use is retained until a predetermined time period has elapsed since the time when a communication is disrupted. Further, the TV microcomputer 64 includes a section having an OSD generating function. This section, having a function for generating the OSD, controls a screen such as a television so that information such as program channel, time, sound volume is displayed on the screen. In general, an image device, such as a television, or an electronic device for use in a video conference system or the like displays, on a screen, the information of program channel, time, sound volume, or the like. OSD data, which is not an image, is retained in a format called "bitmap". This bitmap is converted into a pixel value, of YUV format, which is expressed as Y, Cb, or Cr. Then, the pixel value thus converted is superimposed on an original image of a TV broadcasting or the like. Further, by connecting an image reproduction device (not shown), such as a DVD player or the like, to the video-4 input terminal (also for TV output) 21, it is possible to carry out the OSD displaying, on a displaying screen, in which the pixel converted is superimposed on a reproduced image. Note that it is the OSD combining section 69 that performs the process of superimposing the OSD on the original image of the TV broadcasting or the like.

The TV main body 3 may be arranged so as to include a speaker, a key-input section, and a slot to and from which a card-type external extension storage medium can be attached and detached(not shown). This allows a direct read-out of data from the card-type external extension storage medium which is attached to the slot. Examples of the card-type external extension storage medium include: (I) an SRAM (Static RAM) card which uses a back-up power source for retaining information which has been written in; (II) Compact Flash® (CF) which is constituted of a flash memory or the like requiring no back-up memory; (III) Smart-Media™; (IV) Memory Stick™; (V) a super small hard disc drive (HDD), or the like, whose size is similar to that of Compact Flash®; or (VI) a super small hard disc drive (HDD), or the like, which is attachable to a PC-card type II.

The remote controller light receiving section 66 is an optical communication port section which uses IR (Infrared) light. This remote controller light receiving section 66 receives an optical signal from the remote control device, the optical signal causing the TV main body 3 or the wireless center 2 to perform various operations. Examples of such a remote controller light receiving section 66 includes: (I) an I/O port for use in performing an optical communication in compliance with, for example, IrDA (Infrared Data Association) which is a standard for data transmission using infrared light, or ASK (Amplitude Shift Keying); and (II) a wireless communication port for use in communication using an electric wave.

The battery 67 supplies a predetermined power to each section of the TV main body 3. When it becomes possible to charge the battery 67, the battery charger microcomputer 68 controls, via the power supply terminal (not shown), an electrical charging/discharging with respect to an electric charging medium (not shown) of the battery 67. For example, the battery charger microcomputer 68 controls the electrical charging/discharging, when detecting that (I) the TV main body 3 is fixed on the wireless center 2 or on other cradle or the like; or (II) the TV main body 3 is connected to the AC power source 22 or the Car-DC power source 23. More, specifically, the battery charger microcomputer 68 accumulates a current discharged from a battery-pack. When it is judged that a remaining capacitance becomes equal to or less than a predetermined value, the battery charger microcomputer 68 starts charging the battery pack. While the battery pack is charged, the battery charger microcomputer 68 accumulates a charged current. When it is judged that the battery pack is fully charged, the battery charger microcomputer 68 stops charging the battery pack. While the TV main body 3 is detached from a commercial power source, the charged battery 67 serves as a main power source for a portable TV, and supplies power to each section of the main body.

As illustrated in FIG. 2, in the present embodiment, the wireless center microcomputer 37 of the wireless center 2 includes: an ID transmitting section 140 (identification information transmitting means); a remote-controller data acquiring section 141 (remote-controller data acquiring means); and a remote control section 142 (remote control means). Further, as illustrated in FIG. 3, in the present embodiment, the TV microcomputer 64 of the TV main body 3 includes an ID acquiring section 150 (identification information acquiring means) and a remote-controller data producing section 151 (remote-operation data producing means, remote-operation data transmitting means). Functions of the respective sections are described later.

Figure 4:
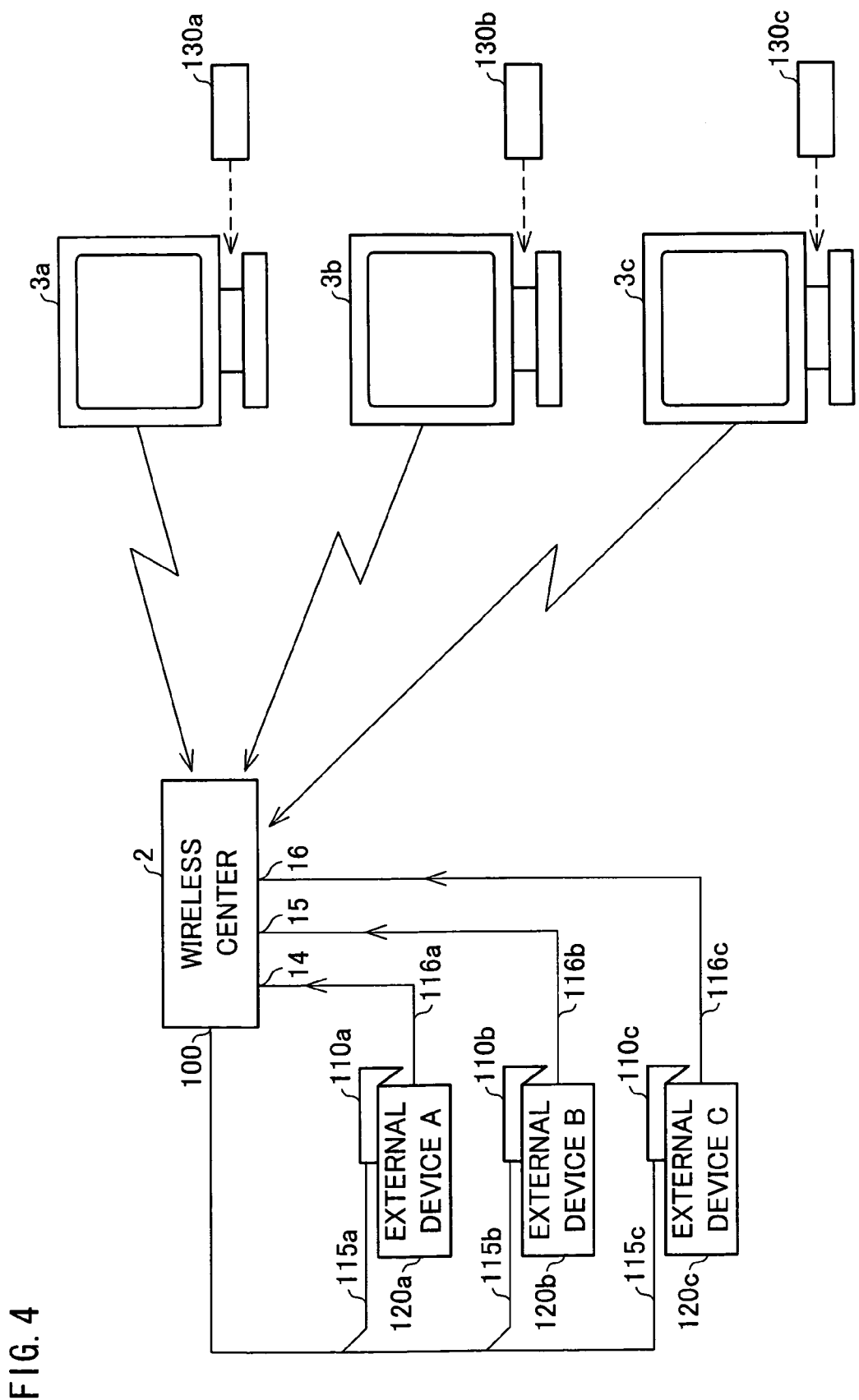
FIG. 4 is a block diagram illustrating an example where: (I) three external devices are connected to the wireless center illustrated in FIG. 2; and (II) three TV main bodies, as illustrated in FIG. 3, are used.

FIG. 4 is a block diagram illustrating an example where (I) three external devices 120*a* to 120*c* are connected to the wireless center 2 of the present embodiment, and (II) three TV main bodies 3*a* to 3*c* are used as terminal devices. As illustrated, three IrDA light hemitting devices 110*a* to 110*c* (infrared transmitting means) are connected to the wireless center 2, via the IrDA terminal 100 and IrDA output cables 115*a* to 115*c*. The IrDA light emitting devices 110*a* to 110*c* are respectively provided to external devices 120*a* to 120*c*.

Further, AV signals are respectively outputted from the external devices 120*a* to 120*c* to the wireless center 2, via AV cables 116*a* to 116*c* and external input terminals 14 to 16. The TV main body 3 (3*a* to 3*c*) is arranged as follows: it receives the remote-controller signal from the remote controller 130 (130*a* to 130*c*), the remote-controller signal being transmitted upon operation of the remote-controller 130 (130*a* to 130*c*) by a user; and the TV main body 3 (3*a* to 3*c*) transmits the remote-controller signal to the wireless center 2.

Here, the external device 120 which is connectable to the wireless center 2 can be, for example, (I) a device for recording and reproducing an image and sound (e.g., VTR, DVD recorder, HDD recorder); (II) a device for receiving various broadcasting signals (e.g., STB, tuner); or (III) a device for producing an image signal and sound signal (e.g., video camera). Note that, in the present embodiment, remote-controller data (remote-operation data) is transmitted from the wireless center 2 by using the infrared light. Accordingly, the external device 120 includes a remote control light receiving section for receiving the infrared remote-controller data.

Figure 5:
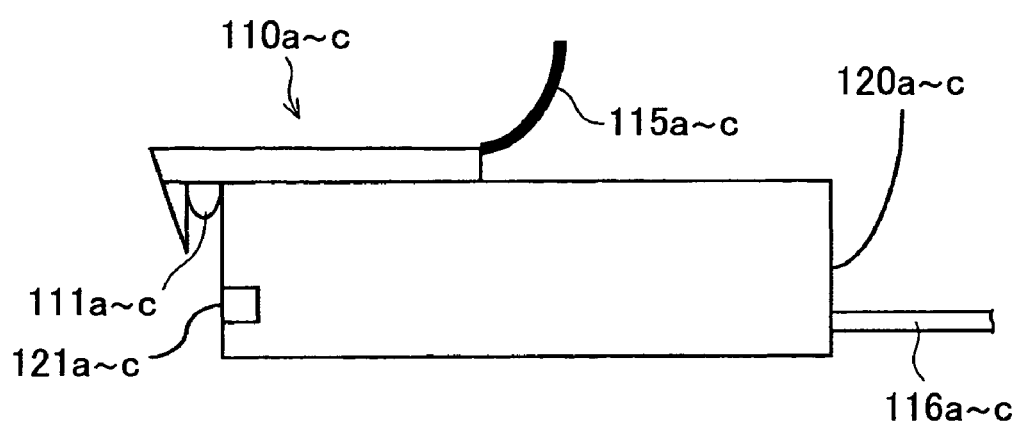
FIG. 5 is a diagram illustrating in detail a configuration of an IrDA light emitting device provided to the-external devices illustrated in FIG. 4.

FIG. 5 is a diagram illustrating in detail a configuration of the IrDA light emitting devices 110*a* to 110*c* to be respectively provided to the external devices 120*a* to 120*c*. As illustrated, IrDA light emitting devices 110*a* to 110*c* respectively include light emitting elements 111*a* to 111*c* so that infrared light from the light emitting elements 111*a* to 111*c* are directed to remote control light receiving sections 121*a* to 121*c* of the external devices 120*a* to 120*c*, respectively. In this way, when the, IrDA light emitting devices 110*a* to 110*c* transmit the remote-controller data by using the infrared light, the external devices 120*a* to 120*c* can receive the remote-controller data at the remote control light receiving sections 121*a* to 121*c*, respectively. This allows the wireless center 2 to remotely operate each of the external devices 120*a* to 120*c*.

Next, with reference to FIG. 6 through FIG. 9, the following describes a process in which the remote-controller data are transmitted to the external devices 120a to 120c connected with the wireless center 2, when the user uses the remote controllers 130a to 130c with respect to the TV main bodies 3a to 3c, the process being carried out in the wireless AV system 1 of the present embodiment having the configuration illustrated in FIG. 4.

FIG. 6 is a diagram illustrating an exemplary configuration of a connected-device information table stored in the EEPROM 38 of the wireless center 2. Note that the connected-device information table may be stored in a storage device other than the EEPROM 38.

As illustrated in FIG. 6, the connected-device information table includes: (I) DEVICE ID indicating a device ID (identification information) uniquely given to each of the connected devices 120a to 120c, i.e., each of the external devices currently being connected to the wireless center 2; (II) DEVICE NAME indicating names of the external devices; (III) TERMINAL indicating the TV main body using the external device; (IV) OPERATION ENABLED/DISABLED indicating whether or not it is possible to perform a remote control operation by using other TV main body; and (V) VIEWING ENABLED/DISABLED indicating whether or not it is possible to view/listen an image/sound outputted from the external device.

As illustrated in FIG. 6, the unique device ID is assigned to each of the external devices 120a to 120c (external devices A to C) currently connected to the wireless center 2. Note that when a connection configuration of external device is changed, the wireless center 2 requests information of the external devices 120a to 120c from the IrDA light emitting devices 110a to 110c, respectively. Then the wireless center 2 obtains the information via the AV cables 116a to 116c and the external input terminals 14 to 16, respectively, and renews the connected-device information table on a basis of the information obtained.

Figure 7:
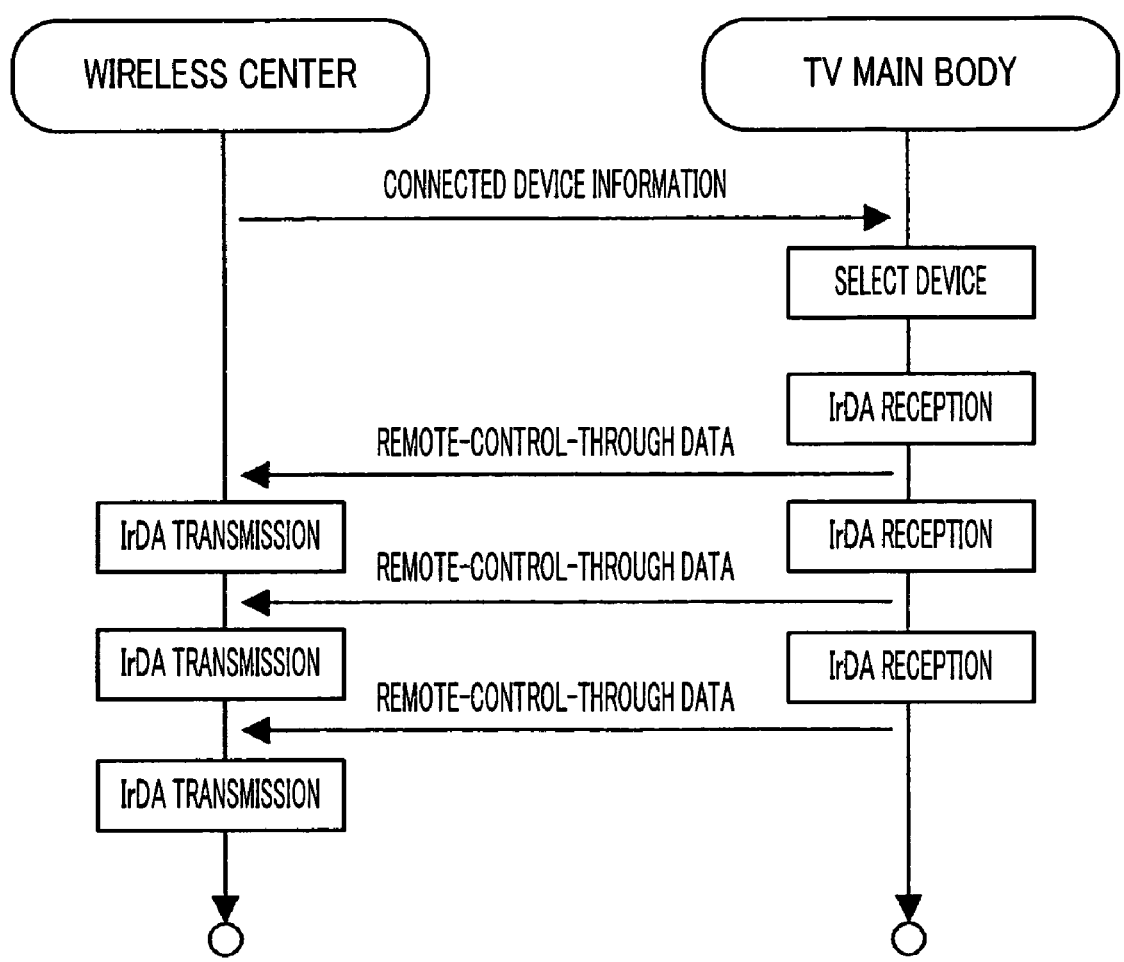
FIG. 7 is a flow diagram illustrating data transmitted/received between the wireless center and the TV main body, the data being for use in remotely operating the external devices illustrated in FIG. 4.

FIG. 7 is a flow diagram illustrating how data are transmitted/received between the wireless center 2 and the TV main bodies 3a to 3c, in order to remotely operate the external devices 120a to 120c. First, as illustrated, based on the connected-device information table stored in the EEPROM 38, respective information about the external devices 120a to 120c connected to the wireless center 2 are prepared as the connected-device information, by the ID transmitting section 140 of the wireless center microcomputer 37 in the wireless center 2. Then, the respective connected-device information which have been prepared are transmitted to the TV main bodies 3a to 3c.

Note that the connected-device information may be transmitted as follows. Namely, the wireless center 2 may transmit, to each of the TV main bodies 3a to 3c, the connected-device information, at a constant time interval or at a predetermined cycle. Alternatively, the wireless center 2 may transmit, to the TV main bodies 3a to 3c, the connected-device information when the connection configuration of the external device with respect to the wireless center 2 is changed. Further, when a user uses the remote controllers 130a to 130c to remotely operate the external device connected to the wireless center 2, the connected-device information may be transmitted as follows. Namely, the TV main bodies 3a to 3c may request the wireless center 2 to transmit respective connected-device information, when: (a) the TV main bodies 3a to 3c have not yet obtained the respective connected-device information; or (b) the constant period or the predetermined period has elapsed since the last time the predetermined connected-device information is obtained. Then, in response to the request, the wireless center 2 may transmit the respective connected-device information to the TV main bodies 3a to 3c.

Figure 8:
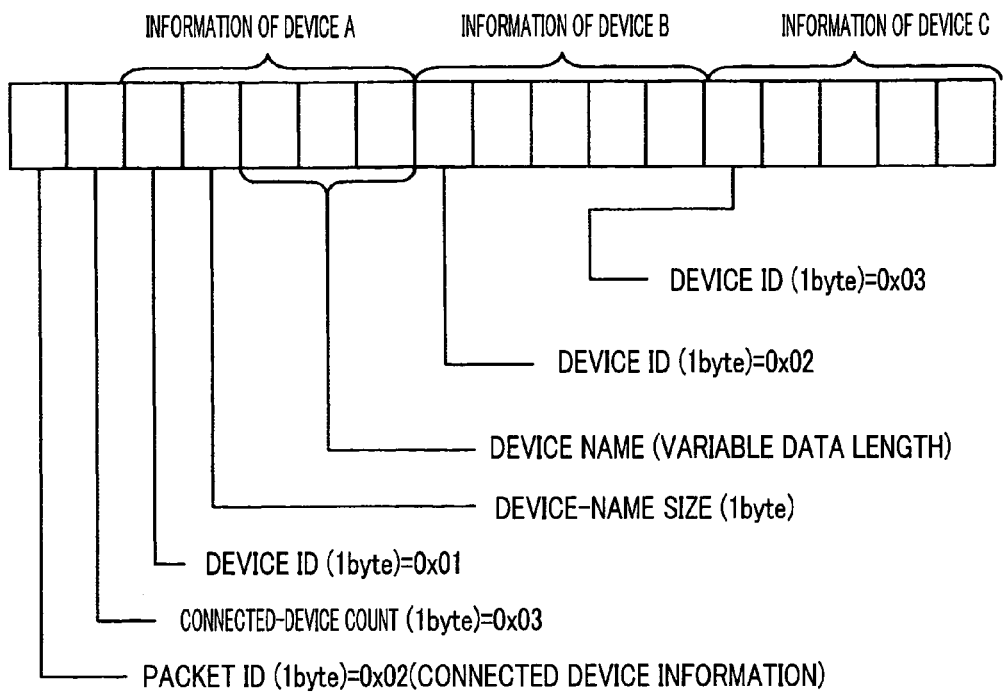
FIG. 8 is a diagram illustrating a configuration of a connected-device information packet transmitted from the wireless center to the TV main body illustrated in FIG. 4, the packet being based on the connected-device information table illustrated in FIG. 6.

FIG. 8 is a diagram illustrating a configuration of a connected-device information packet which is transmitted by the wireless center 2 to the TV main bodies 3a to 3c, based on the connected-device information table illustrated in FIG. 6. As illustrated, the connected-device information packet includes, from its leading end, (I) a packet ID, (II) connected-device number data, and (III) information of an external device A, information of an external device B, and information of an external device C.

The packet ID is data for identifying a packet type. In the present embodiment, the packet ID is 1 byte in data length, and is provided at the leading end of the packet. In the illustrated example, the packet ID is "0x02" which is an ID indicating that the packet is the connected-device information of the wireless center 2. Here, the "0x" is a notation system of C language, and indicates that the following numerals are in hexadecimal notation. Note that the packet ID is previously determined in the wireless AV system 1 of the present embodiment.

The connected-device number data indicates the number of the external-devices in the following pieces of information of the external devices. With the connected-device number data, it is possible to know the number of consecutive data sets each representing external device information. In the present embodiment, the connected-device count data is 1 byte in data length. Further, in the illustrated example, the connected-device number data is "0x03" which indicates the number of the external devices 120a to 120c which are connected to the wireless center 2.

Each piece of the information of the external devices A to C includes a device ID, a device-name size, and a device name. The device ID corresponds to that of the connected-device information table (see FIG. 6) stored in the wireless center 2. The external devices A to C are respectively assigned with "0x01", "0x02", and "0x03". The device name is that of the connected-device information table. Since data length of the device name is variable, the device-name size which indicates the data length of the device name is provided in a position preceding the device name. In the present embodiment, the device ID and the device-name size are both 1 byte in respective data lengths.

After the connected-device information packet having the above mentioned configuration is received by the TV main bodies 3a to 3c, the ID acquiring section 150 of the TV microcomputer 64 in each of the TV main bodies 3a to 3c can re-configure a table similar to the connected-device information table of FIG. 6 stored in the wireless center 2. Thus, it becomes possible to understand the connection configuration of the external devices 120a to 120c connected to the wireless center 2. Further, by indicating to a user, on each display screen of the TV main bodies 3a to 3c, the information of the external devices 120a to 120c which are connected to the wireless center 2, the user can select either one of the external devices 120a to 120c, and remotely operate the selected external device.

See FIG. 7 again. For example, when the user uses the remote controller 130a to (I) select, as an operation target, any one of the external devices 120a to 120c connected to the wireless center 2 and (II) remotely operate the external device thus selected, the remote-controller data producing section 151 of the TV microcomputer 64 in the TV main body 3a prepares a remote-control-through packet on the basis of the remote-controller signal received from the remote controller 130a, and transmits the remote-control-through packet to the wireless center 2. The following description deals with a case where the external device C 120c is selected as the operation target.

Figure 9:
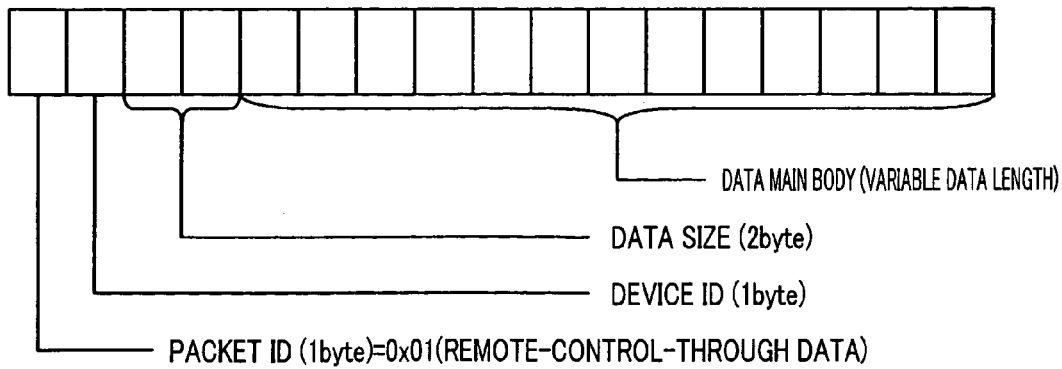
FIG. 9 is a diagram illustrating exemplary configuration of a remote-control-through packet to be transmitted from the TV main body to the wireless center illustrated in FIG. 4.

FIG. 9 is a diagram illustrating an exemplary configuration of the remote-control-through packet which is transmitted, by the TV main body 3a, 3b, or 3c, to the wireless center 2. As illustrated, the remote-control-through packet includes, from its leading end, (I) a packet ID, (II) a device ID, and (III) a data size and (IV) a data main body.

The packet ID and the device ID are the same as those of FIG. 8. In the example illustrated in FIG. 9, the packet ID of the packet is "0x01" which indicates that the packet is the remote-control-through packet. Further, the device ID of the packet is a device ID assigned to the external device selected by the user.

Each data main body is the remote-controller data itself which is optically received from each of the remote controllers 130a to 130c by its corresponding remote controller light receiving section 66 of the TV main bodies 3a to 3c. Since data length of the data main body is variable, the data size which indicates the data length of the data main body is provided in a position preceding the data main body. In the present embodiment, the data size is 2 bytes in data length.

When the remote-control-through packet having the above mentioned configuration is received by the wireless center 2, the SS transmitting/receiving unit 36 recognizes such packet as the remote-control-through packet, with reference to the packet ID at the leading end of the packet. Then, the SS transmitting/receiving unit 36 transmits, as a TV command signal 44, the remote-control-through packet to the wireless center microcomputer 37.

Next, when the remote-controller data acquiring section 141 of the wireless center microcomputer 37 recognizes the packet as the remote-control-through packet with reference to the packet ID located at the leading end of the packet, the remote-controller data acquiring section 141 identifies the external device C 120c as an operation-target external device, with reference to (I) the device ID which is data next to the packet ID, and (II) the connected-device information table stored in the EEPROM 38.

Next, the remote control section 142 of the wireless center microcomputer 37 transmits the remote-controller data to the IrDA light emitting device 110c, via the IrDA terminal 100 and IrDA output cable 115c. The IrDA light emitting device 110c corresponds to the external device C 120c which has been identified as the operation-target external device.

The IrDA light emitting device 110c which has received the remote-controller data transmits, in the form of infrared light, the remote-controller data to the remote control light receiving section 121c of the external device C 120c. The remote-controller data transmitted here is exactly the same as the remote-controller data transmitted, by the user, to the TV main body 3a with the use of the remote controller 130a (remote-control-through). This results in that the user directly carries out the remote control operation with respect to the external device C 120c. Note that the operation similar to the above mentioned operation is carried out when the user uses the remote controller 130b or 130c, and the operation similar to the above one is carried out, when remote operations are carried out with respect to the external device 120a or 120b.

Accordingly, in the wireless AV system 1 of the present embodiment, the wireless center 2 can identify the operation-target external device, with reference to the device ID in the remote-control-through packet (remote-operation data) received from the TV main body 3.

Further, by obtaining the identification information for identifying the external device 120 connected to the wireless center 2, the TV main body 3 is able to select the operation-target external device 120 with the use of the identification information thus obtained. Accordingly, it is not necessary to select the operation-target external device 120 from various kinds of the external devices 120 that can possibly be connected to the wireless center 2.

Further, even if the connection configuration of the external device 120 to be connected with the wireless center 2 is changed, the TV main body 3 can suitably select the operation-target external device 120 by obtaining, from the wireless center 2, the identification information which is based on the connection configuration which has been changed.

Further, the user does not have to directly operate the TV main body 3, and yet the user is able to perform, by operating the remote controller 130, a desired remote operation with respect to a desired external device 120 which is connected to the wireless center 2.

Embodiment 2

Figure 10:
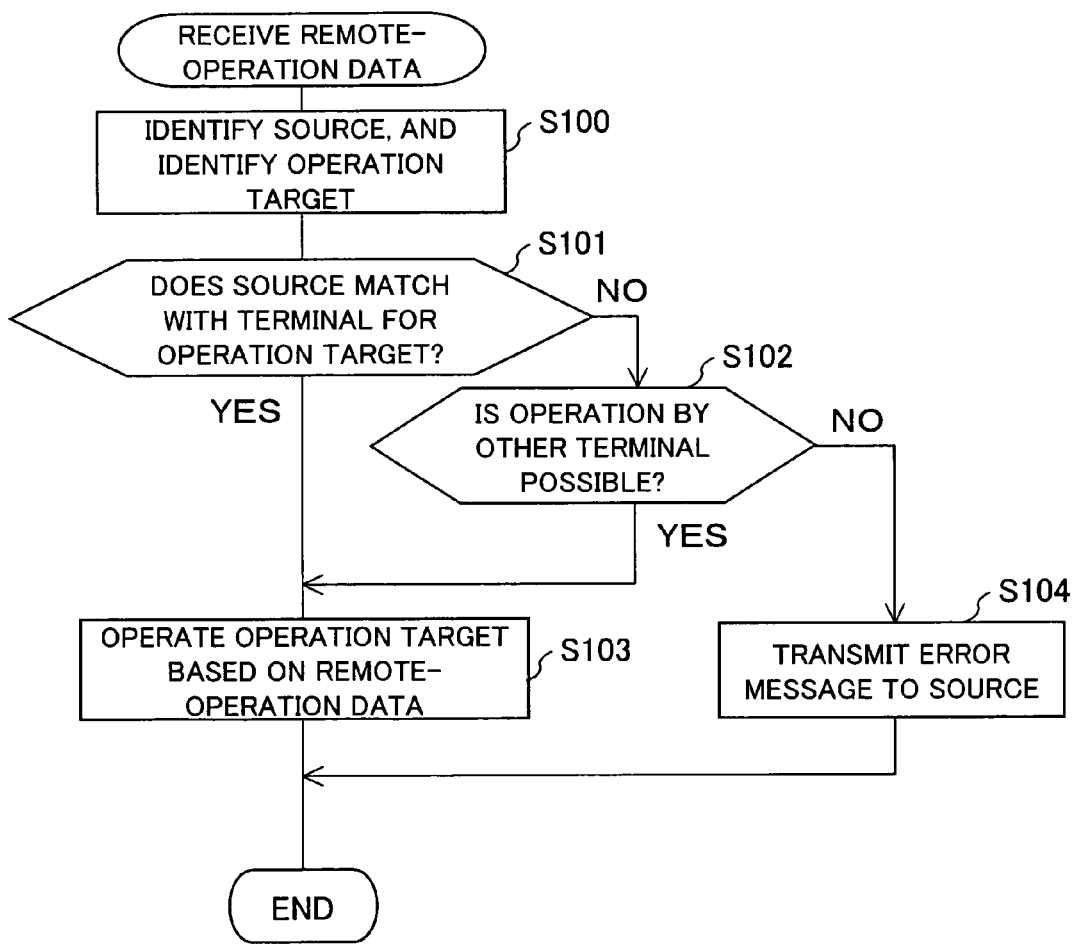
FIG. 10 shows another embodiment of the present invention, and is a flow diagram illustrating processing performed on the basis of settings in the connected-device information table illustrated in FIG. 6, the process being performed upon reception of the remote-control through packet at a wireless center in a-wireless AV system.

The following describes another embodiment of the present invention, with reference to FIG. 10. A wireless AV system of the present embodiment differs from the wireless AV system 1 illustrated in FIG. 1, in that a processing operation is added when a plurality of remote controllers are used for remotely operating a single external device. Other configuration and processing operation than this are similar to those of FIG. 1. Note that the same symbols are given to the configurations that have the same functions as those shown in figures of the foregoing embodiment, and the descriptions of those configurations are omitted here as a matter of convenience.

Incidentally, while a remote controller (e.g., remote controller 130a) is used for remotely operating an external device (e.g., external device A 120a), another remote controller (e.g., remote controller 130b) may be used for remotely operating the external device A 120a, or for viewing/listening to an image/sound outputted from the external device A 120a. In this case, there are following four possible settings.

Setting 1: Remote control operation and viewing/listening are enabled.

Setting 2: Remote control operation is enabled, but not viewing/listening.

Setting 3: Viewing/listening is enabled, but not remote control operation.

Setting 4: Neither remote control operation nor viewing/listening is enabled.

Note that these settings may be different in each of the external devices 120a to 120c.

For example, while a user A is operating the remote controller 130a to allow the videocassette recorder 120a (i.e., external device A) to perform reproduction and to allow the user A to view/listen to, via a TV main body 3a, the image and sound reproduced by the videocassette recorder 120a, it is not preferable for another user B to operate the remote controller 130b to stop the reproduction of the videocassette recorder 120a, or to turn the power off. Accordingly, the setting 3 or the setting 4 is the general one. However, it is not necessarily true that the setting 1 or the setting 2 will never be. adopted.

For example, the setting 1 may correspond to the following case. Namely, the user A is operating the remote controller 130a for the TV main body 3a located on a first floor to allow the videocassette recorder 120a (i.e., external device A) connected to the wireless center 2 to perform the reproduction, and to allow the user A to view/listen to, via the TV main body 3a, the image and sound reproduced by the videocassette recorder 120a. On these occasions, the user A moves to a second floor and wishes to view/listen to the image and sound via the TV main body 3b. In this case, it is necessary for the user A to carry out the remote operation and to view/listen to the image and sound with respect to and from the TV main body 3b.

Further, for example, the setting 2 may correspond to the following case: the user A uses the remote controller 130a for the TV main body 3a having a small display screen, to remotely operate the videocassette recorder 120a which is the external device A connected to the wireless center 2, and to view/listen to an image and sound reproduced by the videocassette recorder 120a; and on these occasions, the user A wishes to view/listen to the image and sound reproduced by the videocassette recorder 120a via (I) the TV main body 3b having a large screen, or (II) the TV main body 3c which is capable of three-dimensional displaying. In this case, it is not necessary to use the TV main body 3a to view/listen to the image and sound, and the TV main body 3a only needs to be capable of being subject to the remote control operation.

In the present embodiment, a wireless center microcomputer 37 controls, upon reception of a remote-control through packet, a remote control operation from the TV main body 3a to 3c in accordance with the foregoing 4 settings. On this account, in the present embodiment, USING TERMINAL, OPERATION ENABLED/DISABLED information, and VIEWING FEASIBILITY information of a connected-device information table (See FIG. 6) are used. Further, a TV main body ID for specifying the TV main bodies 3a to 3c is added to the remote-control through packet illustrated in FIG. 9, in order to specify a sender of the packet.

FIG. 10 is a flow diagram illustrating a processing operation carried out by the wireless center microcomputer 37, upon reception of the remote-control through packet by the wireless center microcomputer 37, in accordance with the foregoing settings. As illustrated, when receiving the remote-control through packet, the wireless center microcomputer 37 specifies (i) the TV main body from which the remote-control through packet has been transmitted and (ii) an operation-target external device, with reference to the TV main body ID and a device ID included in the remote-control through packet (Step S100: hereinafter simply referred to as S100. The same goes for other steps too).

Next, it is judged, by referring to the connected-device information table stored in the EEPROM 38, whether or not the TV main body 3 which is the using terminal of the operation-target external device thus specified coincides with the TV main body 3 which is the sender of the packet operation-target(S11). If not ("No" in S101), it is judged, with further reference to OPERATION ENABLED/DISABLED of the connected-device information table, whether or not it is possible to operate by a terminal other than the using terminal (S102).

If the sender of the packet coincides with the using terminal (i.e., Yes in S101), or if it is possible to operate by a terminal other than the using terminal (i.e., Yes in S102), the remote control data is transmitted, as is the case of the foregoing embodiment, to the IrDA light emitting device 110 of the operation-target external device. Then, the remote control operation is carried out, as is the case of the foregoing embodiment, with respect to the operation-target external device based on the remote control data (S103), and then the processing operation is ended.

On the contrary, if the sender of the packet does not coincide with the using terminal, and if an operation by a terminal other than the using terminal is prohibited (i.e., NO in S102), then an error message is transmitted to the TV main body of the sender (S104), and the processing operation is ended. For example, the error message may be "the remote control operation can not be carried out because of usage by another TV main body".

As described, in the wireless AV system 1 of the present embodiment, the wireless center 2 refers to the connected-device information table to judge whether or not a remote-control operation can be carried out, even when the same external device 120 is remotely operated via the plurality of the TV main bodies 3. Accordingly, the foregoing problem can be avoided in the wireless AV system 1 of the present embodiment.

Note that it is possible to perform a waiting process, instead of the process (S104) of sending the error message. More specifically, in a case of carrying out the waiting process, information of TV main body 3 of the sender is added to a queue of the using terminal provided for each of the external devices 120. When the remote control operation with respect to a current using terminal is finished, the information of the TV main body 3 is taken out from the queue, and the TV main body is designated as a new using terminal. In this case, it is preferable that a message reading, for example, "waiting to perform the remote operation until the use by other TV main body finishes" be transmitted to the source TV main body, while the TV main body 3 is queued in line, and that a message reading, for example, "the remote operation is now enabled" be transmitted to the source TV main body, when the source TV main body exit the queue and becomes the new using terminal.

In the flowchart illustrated in FIG. 10, the control is carried out based on the OPERATION ENABLED/DISABLED information. When the control is carried out based on the VIEWING ENABLED/DISABLED information, the "remote control operation" in the message is modified to "viewing/listening", and the process operation of the step S103 is modified to a process operation in which "an image data and a sound data from the external device 120 are transmitted to the TV main body 3 of the sender.

As described, the foregoing description deals with the specific examples of a device controlling system in a wireless AV system of the present invention. However, the present invention is not limited to these. It is clear that a person with ordinary skills in the art may add various modifications to the configuration and/or the function of the present invention thus described in each of the foregoing embodiments, without departing from the spirit and scope of the invention.

For example, the foregoing embodiments deal with the case where an infrared remote controller is used as means for remotely controlling the wireless center 2. However, it is possible to remotely operate the wireless center 2 with the use of other wireless communication technology such as IEEE 802.11. It is also possible to remotely operate the wireless center 2 with the use of a desirable wired communication technology such as USB or IEEE 1394.

Further, in the foregoing embodiments, the center device transmits, to the terminal device, the device ID and the device name from the connected-device information table. However, it is possible to further transmit the using terminal information, the OPERATION ENABLED/DISABLED information, and the VIEWING ENABLED/DISABLED information. By doing so, it is possible to know, via the TV main body, whether or not the external device can be operated. This allows reduction of data transmission from the TV main body to the center device.

In the above-described embodiments, the wireless AV device is a mobile TV. Not limited to this, however, the present invention can be applied not only to a TV receiver but also to devices having a wireless communication capability or devices in which a TV receiver and the device having a wireless communication capability are combined with each other. For instance, the AV device may be a VTR (Video Tape Recorder) or a recording/reproduction device which uses HDD/DVD as a recording medium. Also, a device capable of performing data transmission/reception, which is combined with information equipment such as a PC. The present invention can be adopted in any type of system. In addition, the content of data is not limited to a specific one.

The present embodiment took the TV receiver as an example. Not limited to this, however, the present invention may be applied to, as described above, a tuner and a personal computer, or another type of AV device adopting a tuner.

The types of the processing sections of the aforesaid wireless communication device and wireless AV system, and the types and formats of the setting information are not limited to those described in the aforesaid embodiments. The present invention can be suitably applied to devices compliant with HAVi (Home Audio/Video Interoperability).

As the tuner, a BS tuner and a UHF/VHF tuner were taken as examples. However, the type of broadcast and the number of the tuners are not limited to the above, and hence a CS tuner may be adopted.

Further, the name of the wireless communication device and the wireless AV system in the present embodiment is merely chosen for the sake of convenience. These may be called wireless communication device, AV device, broadcasting station selecting device, or the like.

The wireless communication device and the wireless AV system described above can be realized by a program causing the wireless communication device and/or the wireless AV system to appropriately function. Such a program is stored in a computer-readable recording medium. Such a program medium may be a main memory, or a program medium may be used which can be read by inserting the recording medium in an external storage device.

In addition, in either of the cases, the contained program may be executed by the access of a CPU. Further, the program may be read and then downloaded to a program storage area (not illustrated) where the program is executed. Assume that the program for download is stored in a main body device in advance.

In addition, the program medium is a recording medium arranged so that it can be separated from the main body. Examples of such a program medium include a tape, such as a magnetic tape and a cassette tape; a magnetic disk, such as a Floppy disk or a hard disk; an optical disc, such as a CD/MO/MD/DVD; a card, such as an IC card or optical card; and a semiconductor memory, such as a mask ROM, an EPROM, an EEPROM, or a flash ROM. All these storage media hold a program in a fixed manner.

Alternatively, although not illustrated, if there is provided means for being connected to an external communications network, a medium, carrying the program in a floating manner, which allows a program to be downloaded over the communications network via the means for being connected to the external communications network may be used.

Further, when the program is downloaded over a communications network in this manner, it is preferable if the program for download is stored in a main body device in advance or installed from another recording medium. Note that content stored in the recording medium is not limited to the program, and the content may be stored in the form of data.

Not limited to the embodiments above, it will be obvious that the present invention may be varied in many ways within the scope thereof. For example, the present invention may be configured as follows.

For example, the present invention includes a device controlling system, for use in a wireless AV system, having (a) a controlled-side device to which at least one device is connected and (b) at least one controlling-side device, the device controlling system so adapted that the controlled-side device includes: (I) means for storing identification information of the device that has been connected; (II) means for transmitting, to the controlling-side device, the identification information of the device; and (III) means for forwarding, to the device, control data received from the controlling-side device, based on the identification information of the device in the control data.

Further, in the present invention, the controlling-side device may further include: (I) means for receiving a remote control signal having been sent by a user; (II) means which adds, to the remote control signal, identification information of the device to which the remote-control signal is directed, and transmits, to the controlled-side device, the remote control signal to which the identification information has been added.

Further, in the present invention, the controlled-side device may include an infrared emitting section serving as means for establishing connection with the device, the infrared emitting section being capable of performing an infrared wireless communication with respect to a light receiving section of the device.

With the present invention, it is possible to provide a system that allows transmission/reception of data for identifying a controlled-device, along with remote control data, in a case where the remote control data is transmitted/received, through a wireless communication, between a plurality of AV devices in a wireless AV system, the remote control data being outputted upon operation of a remote controller or the like.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

A wireless system of the present invention is useful for an in-home AV network system such as a wireless TV receiver having a detachable display. Not limited to this, the wireless system of the present invention can also be adopted in various types of wireless communication devices such as mobile phones, PHS® (Personal Handy-Phone System), and personal digital assistants (PDAs).

The invention claimed is:

1. A terminal device connected, in a communication-enabled manner, with a center device, so that image and/or sound data is received from the center device, the center device being connected with at least one external device, the terminal device comprising:
   a communication section for communicating with the center device; and
   a control section for controlling an operation of the terminal device, the control section including:
   information acquiring means for acquiring, from the center device via the communication section, identification information for identifying the external device;
   remote-operation data producing means for generating remote-operation data when a remote operation is performed with respect to the external device, the remote-operation data containing (a) remote operation information indicating content of the remote operation, and (b) identification information of the external device to be subjected to the remote operation; and remote-operation data transmitting means for transmitting, to the center device via the communication section, the remote-operation data having been generated by the remote-operation data producing means, wherein:

the information acquiring means further acquires, from the center device via the communication section, device-use-information indicating a use-status of the external device; and the remote-operation data producing means, the remote-operation data transmitting means, or both means judges, based on the device-use-information, whether or not the operation is performed, and wherein the device-use-information is (a) TERMINAL information indicating a terminal device using the external device, (b) OPERATION ENABLED/DISABLED information indicating whether or not it is possible to perform remote operation by using another terminal device, (c) VIEWING ENABLED/DISABLED information indicating whether or not it is possible to view/listen to an image and/or sound outputted from the external device by using the other terminal device, or (d) any combination of (a), (b), and (c).

2. The terminal device as set forth in claim 1, further comprising a remote-controller signal receiving section for receiving a remote-controller signal from a remote-controlling device for use in remotely operating the terminal device, wherein the remote-operation data producing means of the control section generates the remote-operation data, based on the remote-controller signal received by the remote-controller signal receiving section.

3. The terminal device as set forth in claim 2, wherein:

the remote-operation data producing means generates remote-controller information, based on the remote-controller signal, and adds the identification information to the remote-controller information, so as to generate the remote-operation data.

4. A terminal device controlling program for operating the terminal device set forth in claim 3, the terminal device controlling program causing a computer to function as the control section.

5. A terminal device controlling program for operating the terminal device set forth in claim 2, the terminal device controlling program causing a computer to function as the control section.

6. A communication system wherein the terminal device set forth in claim 1 is connected, in a communication-enabled manner, with the center device.

7. The communication system as set forth in claim 6, wherein the terminal device and the center device perform a wireless communication.

8. A terminal device controlling program for operating the terminal device set forth in claim 1, the terminal device controlling program causing a computer to function as the control section.

9. A computer-readable recording medium storing the terminal device controlling program set forth in claim 8 and/or the center device controlling program.

10. A center device, to which at least one external device is connected, for transmitting image and/or sound data to a terminal device, the center device comprising:

a communication section for communicating with the terminal device;

a storage section for storing therein identification information for identifying the external device; and a control section for controlling an operation of the center device, the control section including:

identification information transmitting means for transmitting, to the terminal device via the communication section, the identification information stored in the storage section;

remote-operation data acquiring means for acquiring, from the terminal device via the communication section, remote-operation data for remotely operating the external device, the remote-operation data containing (a) remote-controller information indicating content of the remote operation, and (b) identification information of the external device to be subjected to the remote operation; and remote control means for remotely operating, in accordance with the remote-controller information in the remote-operation data, the external device corresponding to the identification information in the remote-operation data acquired by the remote-operation data acquiring means, wherein:

the storage section further stores therein device-use-information indicating a use-status of the external device; and the remote operation means judges, based on the device-use-information, whether or not the remote operation is performed, and wherein the device-use-information is (a) TERMINAL information indicating a terminal device using the external device, (b) OPERATION ENABLED/DISABLED information indicating whether or not it is possible to perform a remote operation by using another terminal device, (c) VIEWING ENABLED/DISABLED information indicating whether or not it is possible to view/listen to an image and/or sound outputted from the external device by using the other terminal device, or (d) any combination of (a), (b), and (c).

11. The center device as set forth in claim 10, further comprising an infrared transmitting section for transmitting a signal, in a form of infrared light, to the external device, the signal being used for the remote operation means to remotely operate the external device.

12. A center device controlling program for operating the center device set forth in claim 10, the center device controlling program causing a computer to function as the control section.

13. A method for controlling a terminal device which is connected, in a communication-enabled manner, with a center device so that image and/or sound data is received from the center device to which at least one external device is connected, wherein:

the terminal device includes a communication section for communicating with the center device; and the method includes the steps of:

acquiring, from the center device via the communication section, identification information for identifying the external device;

generating remote-operation data when a remote operation is performed with respect to the external device, the remote-operation data containing (a) remote operation information indicating content of the remote operation, and (b) identification information of the external device to be subjected to the remote operation; and transmitting the remote-operation data, which has been generated, to the center device via the communication section, wherein:

in the acquiring step, device-use-information indicating a use-status of the external device is further acquired from the center device via the communication section; and in at least either one of the generating step and the transmitting step, it is judged, based on the device-use information, whether or not the operation is performed; and wherein the device-use-information is (a) TERMINAL information indicating a terminal device using the external device, (b) OPERATION ENABLED/DISABLED information indicating whether or not it is possible to perform remote operation by using another terminal device, (c) VIEWING ENABLED/DISABLED information indicating whether or not it is possible to view/listen to an image and/or sound outputted from the external device by using the other terminal device, or (d) any combination of (a), (b), and (c).

14. A method for controlling a center device to which at least one external device is connected, the center device being for transmitting image and/or sound data to a terminal device, wherein:

the center device includes (a) a communication section for communicating with the terminal device, and (b) a storage section for storing therein identification information for identifying the external device and device-use information indicating a use-status of the external device; and the method includes the steps of:

transmitting, to the terminal device via the communication section, the identification information stored in the storage section;

acquiring, from the terminal device via the communication section, remote-operation data for remotely operating the external device, the remote-operation data containing (a) remote-controller information indicating content of the remote operation, and (b) identification information of the external device to be subjected to the remote operation; and remotely operating, in accordance with the remote-controller information in the remote-operation data, the external device corresponding to the identification information in the remote-operation data that has been acquired, wherein in the remote operation performing step, it is judged, based on the device-use-information stored in the storage section, whether or not the remote operation is performed, and wherein the device-use-information is (a) TERMINAL information indicating a terminal device using the external device, (b) OPERATION ENABLED/DISABLED information indicating whether or not it is possible to perform a remote operation by using another terminal device, (c) VIEWING ENABLED/DISABLED information indicating whether or not it is possible to view/listen to an image and/or sound outputted from the external device by using the other terminal device, or (d) any combination of (a), (b), and (c).

* * * * *